US 6,713,594 B2

(12) United States Patent
Horn et al.

(10) Patent No.: US 6,713,594 B2
(45) Date of Patent: Mar. 30, 2004

(54) POLYCARBONATE WITH HIGH EXTENSIONAL VISCOSITY

(75) Inventors: Klaus Horn, Dormagen (DE); Ralf Hufen, Duisburg (DE); Markus Krieter, Langenfeld (DE); Dirk-Jacques Dijkstra, Leverkusen (DE); Jens Hepperle, Köln (DE); Helmut Münstedt, Buckenhof (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/395,556

(22) Filed: Mar. 24, 2003

(65) Prior Publication Data

US 2003/0181628 A1 Sep. 25, 2003

(30) Foreign Application Priority Data

Mar. 25, 2002 (DE) ............................. 10213230
Jul. 2, 2002 (DE) ............................. 10229594

(51) Int. Cl.$^7$ ............................................. C08G 64/00
(52) U.S. Cl. ..................... 528/196; 528/198; 264/176.1; 264/219
(58) Field of Search .................. 264/176.1, 219; 528/196, 198

(56) References Cited

U.S. PATENT DOCUMENTS 6,613,869 B1  9/2003  Horn et al. .................. 529/108
2003/0060593 A1 * 3/2003  Funakoshi et al. .......... 528/196

FOREIGN PATENT DOCUMENTS

EP          411 433        2/1991

* cited by examiner

Primary Examiner—Terressa M. Boykin
(74) Attorney, Agent, or Firm—Joseph C. Gil; Aron Preis

(57) ABSTRACT

A thermoplastic molding composition that contains a polycarbonate resin having specific extensional Theological properties is disclosed. The composition is particularly suitable for preparing containers.

8 Claims, 4 Drawing Sheets

POLYCARBONATE WITH HIGH EXTENSIONAL VISCOSITY

FIELD OF THE INVENTION

The present invention concerns polycarbonate and more particularly polycarbonate resin suitable for making containers.

SUMMARY OF THE INVENTION

A thermoplastic molding composition that contains a polycarbonate resin having specific extensional rheological properties is disclosed. The composition is particularly suitable for preparing containers.

BACKGROUND OF THE INVENTION

Containers made of polycarbonate are known in principle. These containers are produced from compositions (also known as compounds) containing polycarbonate and conventional functional additives, for example. These compositions contain the polymer (polycarbonate) and functional additives are also known as thermoplastic molding compositions. Examples of the conventional additives, include stabilizers, processing aids and others. The containers made of polycarbonate may also include other components, such as rubber seals or handles made from metal or other materials, for example.

Containers made of polycarbonate display numerous advantageous properties, such as e.g. high transparency, good mechanical properties, high resistance to environmental influences and long service life, together with low weight and simple, inexpensive manufacturability.

Containers made of polycarbonate may be produced by the extrusion blow molding process or by the injection blow molding process, for example.

In extrusion blow molding the polycarbonate is generally melted with a single-screw extruder and molded through a die to form a free-standing parison. The parison usually hangs down from the die. A blowing mold is then placed around the parison, squeezing together the lower end of the parison. Inside the mold the parison is then blown up so that the parison attains the desired shape. After a cooling period the mold is opened and the container (hollow article) may be removed.

Extrusion blow molding is disclosed for example in Brinkschroder, F. J.: "Polycarbonate" in Becker, Braun, Kunststoff-Handbuch, Volume 3/1, Polycarbonate, Polyacetale, Polyester, Celluloseester, Carl Hanser Verlag Munich, Vienna 1992, pages 257 to 264).

The injection blow molding process is a combination of injection molding and blow molding.

Injection blow molding proceeds in three stages:
1. Injection molding of the parison in the plastic temperature range of the polycarbonate
2. Blowing of the parison in the thermoplastic range of the polycarbonate (the core of the injection mold also acts as the blowing mandrel)
3. Stripping of the hollow article and optional cooling of the blowing mandrel with air Injection blow molding is disclosed for example in Anders, S., Kaminski, A., Kappenstein, R., "Polycarbonate" in Becker,/Braun, Kunststoff-Handbuch, Volume 3/1, Polycarbonate, Polyacetale, Polyester, Celluloseester, Carl Hanser Verlag Munich, Vienna 1992, pages 223 to 225.

The disadvantage of the containers made of polycarbonate known from the prior art is that they do not meet certain requirements that are important for the use of the containers in practice.

Thus for example the known polycarbonate containers may burst under severe mechanical loading. This may occur for example if a container filled with liquid is dropped to the ground from a great height, for example from the loading platform of a lorry on which the container is being transported.

The reason for this mechanical failure is typically an uneven wall thickness of the container.

The uneven wall thickness of containers known from the prior art arises during their production, since the polycarbonate melt gives rise to uneven wall thicknesses during processing by the extrusion blow molding process or by the injection blow molding process.

The mechanical strength of containers having an uneven wall thickness may naturally be increased by using much more polycarbonate per container, such that the cross-section of the wall becomes much thicker. This has the disadvantage of increasing the material consumption, however, giving rise among other things to higher cost.

The object of the present invention is therefore to provide a polycarbonate that allows the production of containers having as homogeneous a wall thickness as possible.

DETAILED DESCRIPTION OF THE INVENTION

Figure 1:
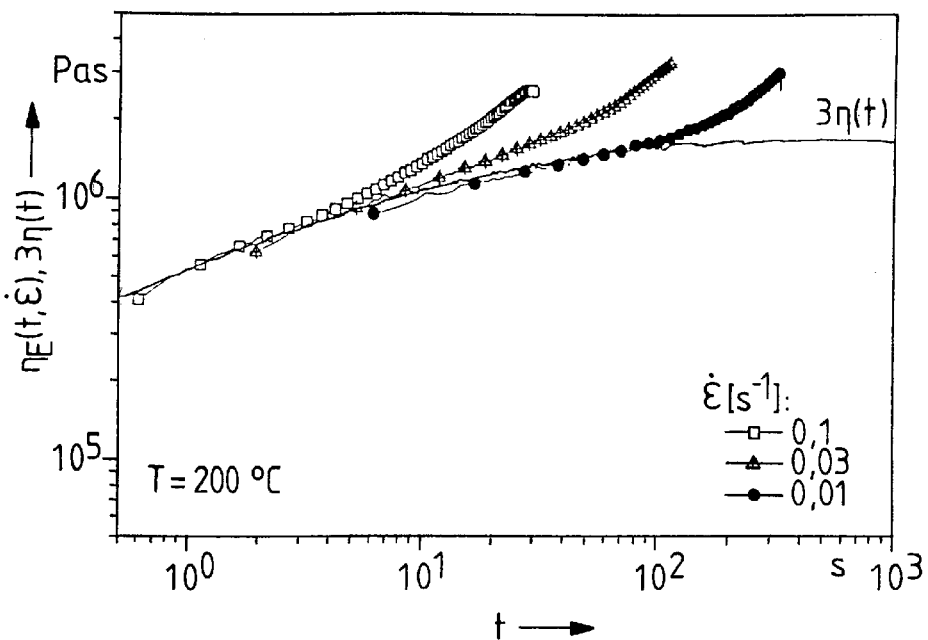
FIG. 1 shows the uniaxial extensional viscosity $\eta_E(t, \dot{\epsilon})$ and the shear viscosity multiplied by three, $3\eta(t)$, for a polycarbonate that is suitable for the production of water bottles.

This object is achieved by a polycarbonate in which in the uniaxial elongation test performed at a temperature of 200° C. with rising Hencky strain $\epsilon$ the extensional viscosity $\eta_E$ rises more sharply than the value of the shear viscosity multiplied by three, $3\eta$.

This polycarbonate is provided by the present invention.

The uniaxial elongation test and its performance are known to the person skilled in the art. The uniaxial elongation test may be performed with devices based on the M ünstedt elongation rheometer. This device is described in H. Müinstedt, J. Rheol., Volume 23, page 421 (1979). Similar rheometers are also described in current textbooks such as e.g. in Ch. W. Macosko: Rheology, Verlag Chemie, 1994, in particular pages 288 to 297, and in M. Pahl, W. Gleißle, H.-M. Laun: Praktische Rheologie der Kunststoffe und Elastomere, VDI-Verlag, 1995, in particular pages 349 to 357.

The methods for determining the shear viscosity as a function of time and for determining the shear viscosity as a function of time are known to the person skilled in the art.

Shear viscosity as a function of time is preferably determined in a rotational rheometer at low shear rates. Shear viscosity may also be determined in a rotational rheometer under oscillating deformation and converted to a timedependent viscosity by means of conventional methods. The design and mode of use of rotational rheometers are described in current textbooks, for example in M. Pahl, W. Gleißle, H.-M. Laun: Praktische Rheologie der Kunststoffe und Elastomere, VDI-Verlag, 1995 and Ch. W. Macosko: Rheology, Verlag Chemie, 1994.

Extensional viscosity as a function of time is preferably determined using an extensional rheometer according to Münstedt. The uniaxial elongation test may also be performed with a series of other rheometers, for example with the commercially available extensional rheometer according to Meissner. This is described in J. Meissner, Rheologica Acta 8, Volume 78 (1969) and in J. S. Schulze et al., Rheol.

Acta, Volume 40 (2001) pages 457–466.

The Hencky strain $\epsilon$ is a dimensionless quantity. The unit for extensional viscosity $\eta_E$ is the Pascal multiplied by seconds. The unit for shear viscosity $\eta$ is likewise the Pascal multiplied by seconds.

The quotient S is used as a measure for the relative increase in extensional viscosity $\eta_E$. The quotient S is dimensionless. S is the quotient of the extensional viscosity $\eta_E$ and the shear viscosity multiplied by three, $3\eta$. S depends on the measurement temperature T, the Hencky strain rate $\dot{\epsilon}$ (unit: 1 divided by seconds) and the Hencky strain $\epsilon$ and time.

The following formula applies:

$$S=\eta_E(t,\dot{\epsilon}) \text{ divided by } 3\eta(t)$$

The total strain $\epsilon$ (unit: dimensionless) is linked to the initial specimen length $L_0$ (unit: metres) and the current specimen length L (unit: metres) and to the strain rate $\dot{\epsilon}$ and the time t (unit: seconds) by means of:

$$\epsilon=\text{natural logarithm of (L divided by } L_0)=\dot{\epsilon} \text{ multiplied by } t$$

A polycarbonate is preferred for which at a temperature of 200° C., with a Hencky strain $\epsilon$ of 2.0 and a strain rate range $\dot{\epsilon}$ of between 0.1 and 0.01, the ratio S is greater than 1.1 and with a Hencky strain $\epsilon$ of 2.5 and a strain rate range $\dot{\epsilon}$ of between 0.1 and 0.01, the ratio S is greater than 1.1, whereby S is defined as $S=\eta_E$ divided by $3\eta$.

Particularly preferred is a polycarbonate for which at a temperature of 200° C., with a Hencky strain $\epsilon$ of 2.0 and a strain rate range $\dot{\epsilon}$ of between 0.1 and 0.01, the ratio S is greater than 1.3 and with a Hencky strain $\epsilon$ of 2.5 and a strain rate range $\dot{\epsilon}$ of between 0.1 and 0.01, the ratio S is greater than 1.5.

The present invention also provides a container made of the polycarbonate according to the invention. This means a container which contains the polycarbonate as a wall material, for example. It does not mean a container made from a completely different material, which simply contains the polycarbonate as its contents.

The present invention also provides a process for producing this container by extrusion blow molding or by injection blow molding.

In order to obtain polycarbonates having the extensional rheological properties according to the invention, the person skilled in the art may selectively adjust various parameters of the polycarbonates. He may for example influence the molecular weight and degree of crosslinking. The choice of monomers and comonomers in the case of copolycarbonates or of terminal groups also has an influence on the extensional rheological properties of the polycarbonates. The person skilled in the art may also use suitable additives to obtain the desired extensional Theological properties according to the invention. The present invention is therefore substantiated in that the person skilled in the art prepares the polycarbonates according to the invention having the extensional rheological properties according to the invention and uses them for the purpose of producing the containers according to the invention. These containers have the surprisingly good properties described in the present specification.

The present invention also provides the production of the containers according to the invention.

The present invention also provides the use of the containers according to the invention.

The advantage of the polycarbonate according to the invention lies in the fact that it makes it possible to produce the containers according to the invention with their advantageous properties.

The containers according to the invention have the advantage that with the specified amount of polycarbonate per container they have high mechanical strength.

They also have the advantage that they may be produced with a homogeneous wall thickness distribution.

The containers according to the invention display numerous other advantages. They are resistant to mechanical loading, i.e. fracture resistant, and they also have an advantageous spectrum of other mechanical properties. They have good optical properties, in particular they display high transparency. They have a high heat resistance. By virtue of their high heat resistance the containers according to the invention may be cleaned with hot water or sterilized with hot steam. They have a high resistance to the conventional cleaning agents that are used for example for cleaning water bottles for multiple use, one field of application for the containers according to the invention. They may be produced easily and inexpensively by known processes. The good processing properties of the polycarbonate are advantageously expressed here. They display low material ageing in use and hence a long service life. For a multiple usage that may optionally occur this means numerous cycles of use.

Containers within the meaning of the present invention may be used for the packaging, storage or transport of liquids, solids or gases. Containers for the packaging, storage or transport of liquids (liquid containers) are preferred, containers for the packaging, storage or transport of water (water bottles) are particularly preferred.

Containers within the meaning of the invention are preferably hollow articles having a volume of 0.1 l to 50 l, preferably 0.5 l to 50 l, whereby volumes of 1 l, 5 l, 12 l and 20 l are most particularly preferred.

3 and 5 gallon water bottles are most particularly preferred.

The containers preferably have an empty weight of preferably 0.1 g to 3000 g, most preferably 50 g to 2000 g and particularly preferably 650 g to 900 g.

The wall thicknesses of the containers are preferably 0.5 mm to 5 mm, most preferably 0.8 mm to 4 mm.

Containers within the meaning of the present invention preferably have a length of preferably 5 mm to 2000 mm, particularly preferably 100 mm to 1000 mm.

The containers preferably have a maximum circumference of preferably 10 mm to 250 mm, most preferably 50 mm to 150 mm and most particularly preferably 70 to 90 mm.

Containers within the meaning of the invention preferably have a bottle neck of a length of preferably 1 mm to 500 mm, most preferably 10 mm to 250 mm, particularly preferably 50 mm to 100 mm and most particularly preferably 70 to 80 mm.

The wall thickness of the bottle neck of the containers preferably varies between 0.5 and 10 mm, particularly preferably from 1 mm to 10 mm and most particularly preferably from 5 mm to 7 mm.

The diameter of the bottle neck preferably varies between 5 mm and 200 mm. 10 mm to 100 mm are particularly preferred and 45 mm to 75 mm are most particularly preferred.

The bottle base of the containers according to the invention has a diameter of preferably 10 mm to 250 mm, most preferably 50 mm to 150 mm and most particularly preferably 70 to 90 mm.

Containers within the meaning of the invention may display any geometrical shape whatsoever, they may for example be round, oval or polygonal or angular with for example 3 to 12 sides. Round, oval and hexagonal shapes are preferred.

The design of the containers may be based on any surface texture whatsoever. The surface textures are preferably smooth or ribbed. The containers according to the invention may also display several different surface textures. Ribs or beads may run around the circumference of the containers. They may be any distance apart or several mutually different distances apart. The surface textures of the containers according to the invention may display etched or integrated textures, symbols, ornaments, coats of arms, company logos, trademarks, signatures, manufacturer information, material identifications and/or volume information.

The containers according to the invention may display any number of handles, which may be located at the side, on top or underneath. The handles may protrude outwards and or may be integrated into the shape of the container. The handles may be folding or fixed. The handles may be of any shape whatsoever, e.g. oval, round or polygonal. The handles preferably display a length of 0.1 mm to 180 mm, most preferably 20 mm to 120 mm.

In addition to the polycarbonate according to the invention the containers according to the invention may also contain other substances to a small degree, e.g. rubber seals or handles made from other materials.

The containers according to the invention are preferably produced by the extrusion blow molding process or by the injection blow molding process.

In a preferred embodiment in order to produce the containers according to the invention, the polycarbonates according to the invention are processed on extruders having a smooth or grooved, preferably a smooth feed zone.

The drive power of the extruder is selected according to the diameter of the screw. By way of example, the drive power of the extruder is approx. 30 to 40 kW with a screw diameter of 60 mm and approx. 60 to 70 kW with a screw diameter of 90 mm.

The general purpose three-section screws conventionally used in the processing of engineering thermoplastics are suitable.

A screw diameter of 50 to 60 mm is preferred for the production of containers having a volume of 1 l. A screw diameter of 70 to 100 mm is preferred for the production of containers having a volume of 20 l. The length of the screws is preferably 20 to 25 times the diameter of the screw.

In the case of the blow molding process, the blow mold is preferably heated to 50 to 90° C. in order to obtain a brilliant and high-quality surface to the containers.

In order to ensure that the blow mold is heated evenly and efficiently, the base section and the jacket section may be heated separately.

The blow mold is preferably closed with a pinch-off force of 1000 to 1500 N per cm of pinch-off weld length. Before being processed, the polycarbonate according to the invention is preferably dried so that the optical quality of the containers is not impaired by streaks or bubbles and the polycarbonate is not degraded hydrolytically during processing. The residual moisture content after drying is preferably below 0.01 wt. %. A drying temperature of 120° C. is preferred. Lower temperatures do not guarantee adequate drying, while at higher temperatures there is the risk of the pellets of polycarbonate sticking together such that they may no longer be processed. Dry air dryers are preferred.

The preferred melt temperature for processing of the polycarbonate according to the invention is 230° C. to 300° C.

The containers according to the invention may be used for the packaging, storage or transport of liquids, solids or gases. The embodiment as containers that are used for example for the packaging, storage or transport of liquids is preferred. The embodiment as a water bottle that may be used for example for the packaging, storage or transport of water is particularly preferred.

Polycarbonates within the meaning of the present invention are preferably melt processable aromatic polycarbonates. They may be both homopolycarbonates and copolycarbonates.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Polycarbonates in which up to 80 mol %, in particular from 20 mol % up to 50 mol %, of the carbonate groups are replaced by aromatic dicarboxylic acid ester groups are also embraced by the term polycarbonates according to the invention. Such polycarbonates that contain both acid radicals of carbonic acid and acid radicals of aromatic dicarboxylic acids incorporated into the molecule chain are also classed as aromatic polyester carbonates.

The polycarbonates according to the invention may be produced by known means from diphenols, carbonic acid derivatives, optionally chain terminators and optionally branching agents. In order to produce the polyester carbonates a part of the carbonic acid derivatives is replaced by aromatic dicarboxylic acids or derivatives of dicarboxylic acids. This is done according to the carbonate structural units in the aromatic polycarbonates that are to be replaced by aromatic dicarboxylic acid ester structural units.

Details of the production of polycarbonates are known. Reference is made by way of example to:

1. Schnell, "Chemistry and Physics of Polycarbonates", Polymer Reviews, Volume 9, Interscience Publishers, New York, London, Sydney 1964;
2. D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 19, 75–90 (1980);
3. D. Freitag, U. Grigo, P. R. Müller, N. Nouvertne', BAYER AG, "Polycarbonates" in Encyclopedia of Polymer Science and Engineering, Volume 1 1, Second Edition, 1988, pages 648–718;
4. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna, 1992, pages 117–299.

The polycarbonates including the polyester carbonates preferably have weight average molecular weights (Mw) of 12,000 to 120,000 g/mol (obtained by measuring the relative viscosity at 25° C. in methylene chloride at a concentration of 0.5 g polycarbonate per 100 ml methylene chloride). 15,000 to 80,000 g/mol are preferred, whereby 15,000 to 60,000 g/mol are particularly preferred.

Suitable diphenols for production of the polycarbonates according to the invention are, for example, hydroquinone, resorcinol, dihydroxydiphenyl, bis(hydroxyphenyl) alkanes, bis(hydroxyphenyl) cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, (α,α'-bis(hydroxyphenyl) diisopropyl benzenes, and ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl) phenylethane, 2,2-bis(4-hydroxyphenyl) propane, 2,4-bis(4-hydroxyphenyl)-2-methyl butane, 1,1-bis(4-hydroxyphenyl)-m/p diisopropyl benzene, 2,2-bis(3-methyl-4-hydroxyphenyl) propane, bis(3,5-dimethyl-4-hydroxyphenyl) methane, 2,2-bis(3,5-dimethyl-4-hydroxyphenyl) propane, bis(3,5-dimethyl-4-hydroxyphenyl) sulfone, 2,4-bis(3,5-dimethyl-4-hydroxyphenyl)-2-methyl butane, 1,1-bis(3,5-dimethyl-4-hydroxyphenyl)-m/p-diisopropyl benzene, 2,2- and 1,1-bis(4-hydroxyphenyl)-3,3,5-trimethylcyclohexane.

Particularly preferred diphenols are 4,4'-dihydroxydiphenyl, 1,1-bis(4-hydroxyphenyl)phenylethane, 2,2-bis(4-hydroxyphenyl) propane, 2,2-bis(3,5-dimethyl-4-hydroxyphenyl) propane, 1,1-bis(4-hydroxyphenyl) cyclohexane, 1,1-bis(4-hydroxyphenyl)-m/p-diisopropyl benzene and 1,1-bis(4-hydroxyphenyl)-3,3,5-trimethylcyclohexane.

These and other suitable diphenols and their production are disclosed in, for example, U.S. Pat. Nos. 3,028,635, 2,999,835, 3,148,172, 2,991,273, 3,271,367, 4,982,014 and 2,999,846, in DE-A 1 570 703, 2 063 050, 2 036 052, 2 211 956 and 3 832 396, FR-A 1 561 518, in the monograph "H. Schnell Chemistry and Physics of Polycarbonates, Interscience Publishers, New York 1964" and in JP-A 62039/1986, 62040/1986 and 105550/1986.

In the case of homopolycarbonates only one diphenol is used, in the case of copolycarbonates several diphenols are used, whereby the diphenols used (also known as bisphenols), like all other chemicals and auxiliary substances added to the synthesis, may of course be contaminated with impurities originating from their own synthesis, although it is desirable to work with the cleanest possible raw materials.

Suitable chain terminators that may be used in the production of the polycarbonates are both monophenols and monocarboxylic acids.

Suitable monophenols are for example phenol, alkyl phenols such as cresols, p-tert.-butyl phenol, p-n-octyl phenol, p-iso-octyl phenol, p-n-nonyl phenol and p-iso-nonyl phenol, halophenols such as p-chlorophenol, 2,4-dichlorophenol, p-bromophenol and 2,4,6-tribromophenol, or mixtures thereof.

Suitable monocarboxylic acids are for example benzoic acid, alkyl benzoic acids and halobenzoic acids.

Preferred chain terminators are the phenols having the formula (I)

where
R$^6$ stands for H or a branched or unbranched C$_1$–C$_{18}$ alkyl radical.

The quantity of chain terminator to be used is preferably 0.5 mol % to 10 mol %, relative to moles of diphenols used in each case. The chain terminators may be added before, during or after phosgenation.

The polycarbonates may be branched. Suitable branching agents that may be used for branching the polycarbonates are the trifunctional or more than trifunctional compounds known in polycarbonate chemistry, particularly those having three or more than three phenolic OH groups.

Suitable branching agents are, for example, phloroglucinol, 4,6-dimethyl-2,4,6-tri(4-hydroxyphenyl) heptene-2,4,6-dimethyl-2,4,6-tri(4-hydroxyphenyl)heptane, 1,3,5-tri(4-hydroxyphenyl) benzene, 1,1,1-tri(4-hydroxyphenyl) ethane, tri(4-hydroxyphenyl) phenylmethane, 2,2-bis[4,4-bis(4-hydroxyphenyl) cyclohexyl] propane, 2,4-bis(4-hydroxyphenylisopropyl) phenol, 2,6-bis(2-hydroxy-5'-methylbenzyl)-4-methylphenol, 2-(4-hydroxyphenyl)-2-(2,4-dihydroxyphenyl) propane, hexa(4-(4-hydroxyphenyl isopropyl) phenyl)orthoterephthalic acid ester, tetra(4-hydroxyphenyl) methane, tetra(4-(4-hydroxyphenyl isopropyl) phenoxy) methane and 1,4-bis(4',4"-dihydroxytriphenyl)methyl)benzene, as well as 2,4-dihydroxybenzoic acid, trimesic acid, cyanuric chloride and 3,3-bis(3-methyl-4-hydroxyphenyl)-2-oxo-2,3-dihydroindole.

The quantity of branching agents optionally to be used is preferably 0.05 mol % to 2.5 mol %, relative to moles of diphenols used in each case.

The branching agents may either be included with the diphenols and chain terminators in the aqueous-alkaline phase or added ahead of phosgenation dissolved in an organic solvent.

All these measures for producing polycarbonates are familiar to the person skilled in the art.

Suitable aromatic dicarboxylic acids for production of the polyester carbonates are, for example, phthalic acid, terephthalic acid, isophthalic acid, tert.-butyl isophthalic acid, 3,3'-diphenyl dicarboxylic acid, 4,4'-diphenyl dicarboxylic acid, 4,4-benzophenone dicarboxylic acid, 3,4'-benzophenone dicarboxylic acid, 4,4'-diphenyl ether dicarboxylic acid, 4,4'-diphenyl sulfone dicarboxylic acid, 2,2-bis(4-carboxyphenyl) propane, trimethyl-3-phenyl indane-4,5'-dicarboxylic acid.

Of the aromatic dicarboxylic acids, terephthalic acid and/or isophthalic acid are particularly preferably used.

Derivatives of dicarboxylic acids are for example the dicarboxylic acid dihalides and the dicarboxylic acid dialkyl esters, particularly the dicarboxylic acid dichlorides and the dicarboxylic acid dimethyl esters.

Replacement of the carbonate groups by the aromatic dicarboxylic acid ester groups is performed substantially stoichiometrically and also quantitatively, such that the molar ratio of the reactants is also found in the final polyester carbonate. The aromatic dicarboxylic acid ester groups may be incorporated both randomly and in blocks.

The polycarbonates for use according to the invention are preferably produced by the interfacial polycondensation process or by the known melt interesterification process. In the first case phosgene is preferably used as carbonic acid derivative, in the second case preferably diphenyl carbonate.

Catalysts, solvents, working up, reaction conditions, etc., for polycarbonate production are known in both cases.

The melt interesterification process is described in particular in H. Schnell, "Chemistry and Physics of Polycarbonates", Polymer Reviews, Volume 9, p. 44 to 51, Interscience Publishers, New York, London, Sydney, 1964 and in DE-A 1 031 512, in U.S. Pat. No. 3,022,272, in U.S. Pat. No. 5,340,905 and in U.S. Pat. No. 5,399,659.

The polycarbonates according to the invention may also contain conventional additives, for example pigments, UV stabilizers, heat stabilizers, antioxidants and mold release agents in the conventional quantities for polyearbonates.

Where the polycarbonates contain functional additives, the compositions comprising polycarbonate and additives are also known as polycarbonate molding compositions.

These conventional additives may be added to polycarbonates by known means together with the components according to the invention or subsequently.

The polycarbonate molding compositions according to the invention may be processed into molded articles on conventional processing machines by known methods under the conventional processing parameters for polycarbonate.

Raw materials and additives having a low degree of impurities are preferably used in the production of polycarbonate. For production by the melt interesterification process in particular, the bisphenols used and the carbonic acid derivatives used should be as free as possible from alkali ions and alkaline-earth ions. Pure raw materials of this type may be obtained for example by recrystallising, washing or distilling the carbonic acid derivatives, for example carbonic acid esters, and the bisphenols.

Where polycarbonates are produced by the melt interesterification process, the reaction of bisphenol and the carbonic acid diester may be performed continuously or discontinuously for example in stirred-tank reactors, thin-film vaporizers, falling film vaporizers, series of stirred-tank reactors, extruders, kneaders, simple disc reactors and high-viscosity disc reactors.

Carbonic acid diesters that may be used to produce polycarbonates are for example diaryl esters of carbonic acid, whereby the two aryl radicals preferably each have 6 to 14 C atoms. The diesters of carbonic acid based on phenol or alkyl-substituted phenols, in other words diphenyl carbonate or dicresyl carbonate for example, are preferably used. Relative to 1 mole of bisphenol, the carbonic acid diesters are preferably used in a quantity of 1.01 to 1.30 mol, particularly preferably in a quantity of 1.02 to 1.15 mol.

If phenols, alkyl phenols and/or aryl phenols are used in the production of the polycarbonates according to the invention, they have the effect of chain terminators. That means that they limit the maximum average molecular weight that may be achieved. They may either be added together with the monomers that are needed for production of the polycarbonate or in a later phase of polycarbonate synthesis. They act as monofunctional compounds within the meaning of polycarbonate synthesis and thus act as chain terminators.

The phenol, alkyl phenols and/or aryl phenols that are optionally used in the production of the polycarbonate are preferably used in a quantity of 0.25 to 10 mol %, relative to the sum of bisphenols used in each case.

Mixtures of phenol and/or one or more alkyl phenols and/or aryl phenols may also be used.

The alkyl phenols and/or aryl phenols optionally used in the production of the polycarbonate lead to alkyl phenyl terminal groups or to aryl phenyl terminal groups. In addition, other terminal groups may occur in the polycarbonate that is formed, such as e.g. phenolic OH terminal groups or chloroformic acid ester terminal groups, depending on the production process.

Exclusively phenol, alkyl phenols and/or aryl phenols, without the addition of additional substances that may act as chain terminators, are preferably used as chain terminators.

Suitable additional substances that may act as chain terminators are both monophenols and monocarboxylic acids. Suitable monophenols are e.g. phenol, p-chlorophenol or 2,4,6-tribromophenol. Suitable monocarboxylic acids are benzoic acid, alkyl benzoic acids and halobenzoic acids.

The preferred additional substances that may act as chain terminators are phenol, p-tert. butyl phenol, cumyl phenol and isooctyl phenol.

The quantity of additional substances that may act as chain terminators is preferably between 0.25 and 10 mol %, relative to the sum of bisphenols used in each case.

The measurement procedure for determining the uniaxial extensional viscosity is described below.

In order to measure the uniaxial extensional viscosity, a cylindrical polycarbonate specimen (dimensions: diameter between approximately 4 and 5 mm, length between approximately 20 and 25 mm) is fixed at the ends by clamps and clamped in an extensional rheometer.

The specimen is then heated by means of an oil bath, which at the measurement temperature of 200° C. has approximately the same density as the polycarbonate. Once temperature constancy is reached (after approximately 10 min), the deformation is set by means of the take-off rod, which is connected to the clamps at one end of the specimen. A constant Hencky strain rate $\dot{\epsilon}$ is set. This means that the take-off rate u increases exponentially over time.

At the other end of the specimen the tensile force is measured as a function of time or total elongation. The uniaxial extensional viscosity may be determined by relating the tensile stress that is determined to the time-related cross-sectional area.

In the case of the extensional rheometer used for the measurements in the examples in the present specification, the maximum length of the stretched sample is approximately 500 mm, which corresponds to a maximum deformation of $L/L_0=25$ or a maximum Hencky strain $\epsilon$ of approximately $\epsilon=\text{Ln } (L/L_0)=3.2$, wherein $L_0$ is the initial length of the sample. The total elongation was not always achieved in the polycarbonates that were tested, however, since the specimens may tear or fail before the total elongation up to the maximum length of approximately 500 mm is achieved.

The uniaxial elongation test is evaluated as follows. The logarithm of the simple extensional viscosity value and of the shear viscosity value multiplied by three are plotted together against time in a diagram. Surprisingly it was established that the polycarbonates that are suitable for the production of containers are precisely those in which the extensional viscosities rise sharply by comparison to the shear viscosity multiplied by three (see FIG. 1). The polycarbonates in which the extensional viscosities do not rise as much (see FIG. 2) are less suitable or unsuitable for the production of water bottles.

Figure 2:
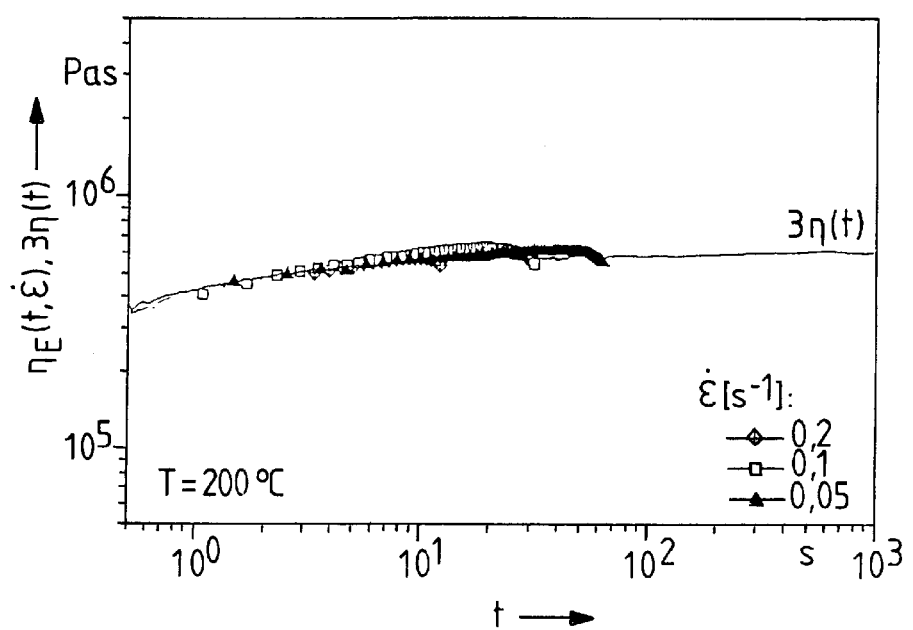
FIG. 2 shows the uniaxial extensional viscosity $\eta_E(t,\dot{\epsilon})$ and the shear viscosity multiplied by three, $3\eta(t)$, for a polycarbonate that is not suitable for the production of water bottles.

FIG. 1 and FIG. 2 are described below.

FIG. 1 shows the uniaxial extensional viscosity $\eta_E(t,\dot{\epsilon})$ and the shear viscosity multiplied by three, $3\eta(t)$, for a polycarbonate that is suitable for the production of water bottles (produced as described in the example according to the invention). The shear viscosity multiplied by three, $3\eta(t)$, is represented as a continuous line. The uniaxial extensional viscosities $\eta_E(t,\dot{\epsilon})$ for three different strain rates $\dot{\epsilon}$ of 0.3, 0.1 and 0.01 (unit: 1 divided by seconds) are represented as lines with symbols. It may be seen that for all strain rates the extensional viscosities rise sharply over time and are ultimately higher than the shear viscosity multiplied by three.

FIG. 2 shows the uniaxial extensional viscosity $\eta_E(t,\dot\epsilon)$ and the shear viscosity multiplied by three, $3\eta(t)$, for a polycarbonate that is not suitable for the production of water bottles (produced as described in the comparative example). The shear viscosity multiplied by three, $3\eta(t)$, is represented as a continuous line. The uniaxial extensional viscosities $\eta_E(t,\dot\epsilon)$ for three different strain rates $\dot\epsilon$ of 0.2, 0.1 and 0.05 (unit: 1 divided by seconds) are represented as lines with symbols. It may be seen that for all strain rates the extensional viscosities do not rise very sharply over time and ultimately come to rest in the vicinity of the shear viscosity multiplied by three.

In FIG. 1 and FIG. 2 the time axis t for a curve with a specific Hencky strain rate $\dot\epsilon$ may be extrapolated to the Hencky strain $\epsilon$, since:

Hencky strain $\epsilon$=Hencky strain rate $\dot\epsilon$ multiplied by time t

Figure 3:
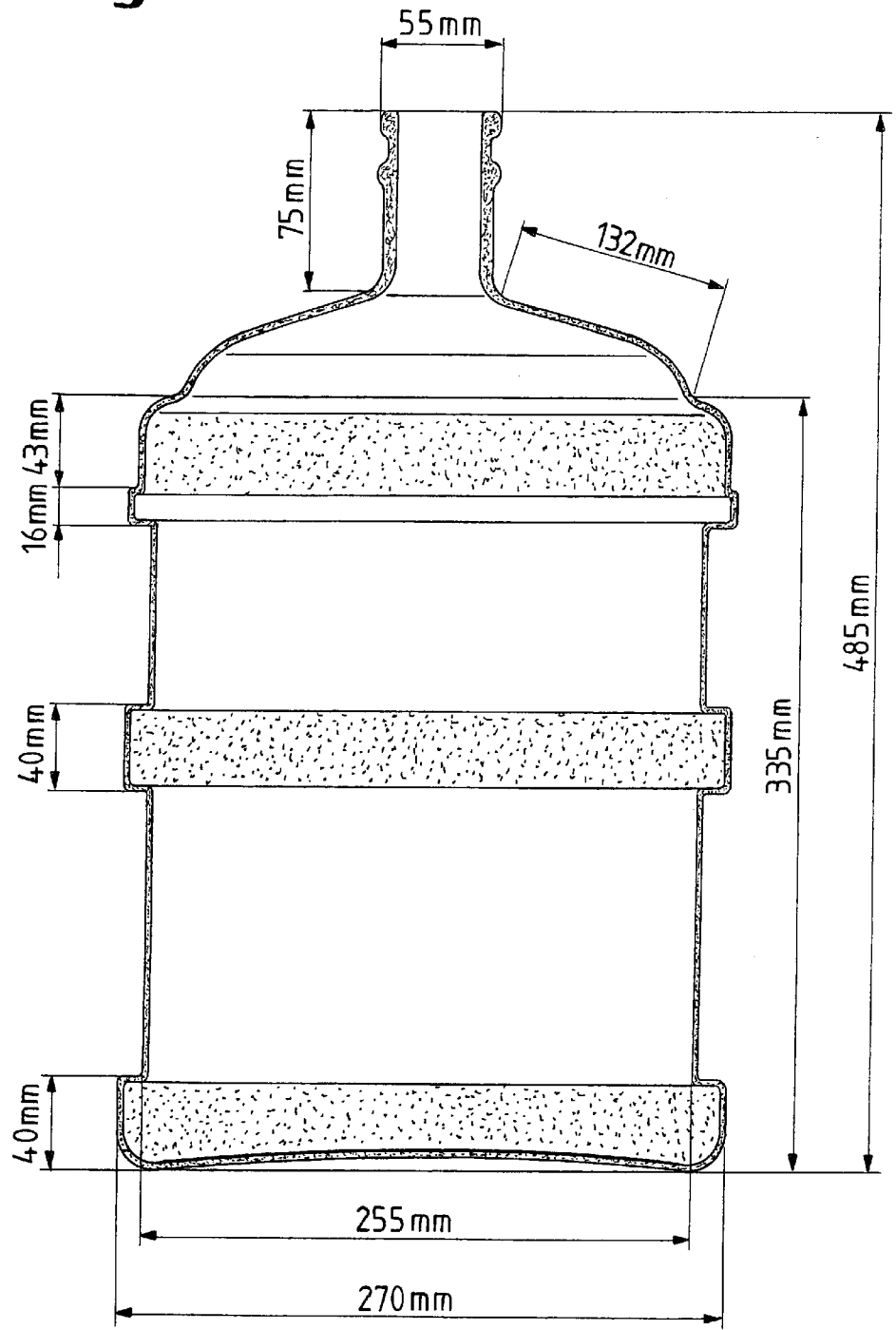
FIG. 3 shows the exemplified bottle.

FIG. 3 shows the bottles produced in the examples. Their dimensions are given in millimetres (mm).

Figure 4:
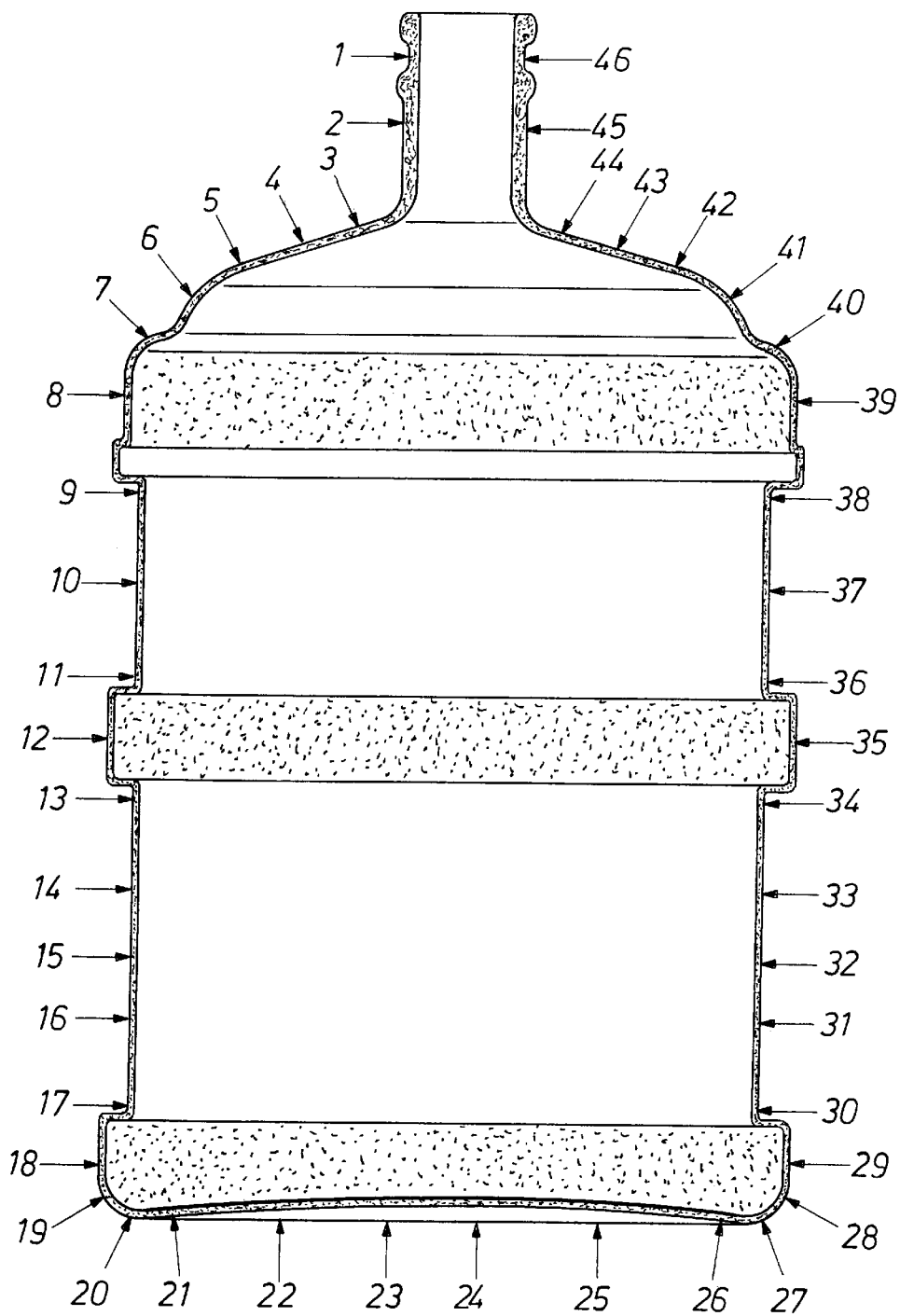
FIG. 4 shows the position of the measuring points on the exemplified bottles.

FIG. 4 shows the position of the measuring points on the bottles at which the wall thickness was measured in the examples.

Figure 5:
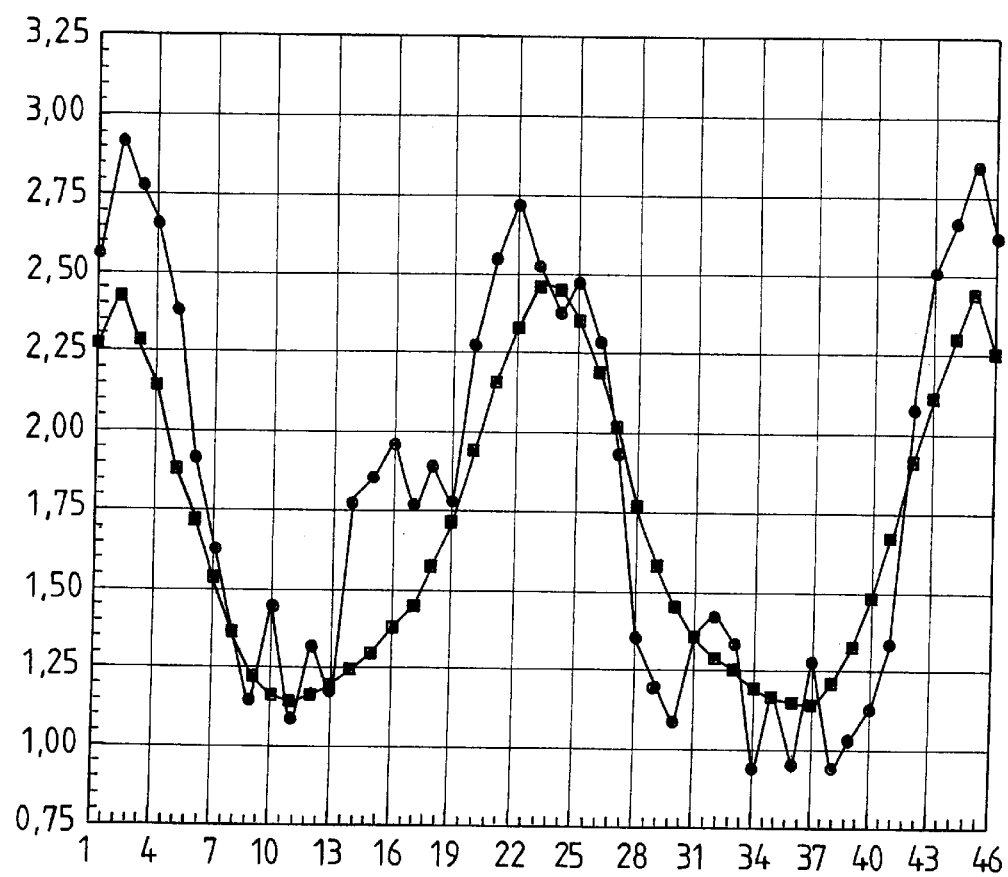
FIG. 5 shows the variation in wall thickness throughout the exemplified bottles.

FIG. 5 shows the variation in wall thickness reproduced in Table 2 in graphical form. The wall thickness in mm is plotted across the measuring points 1 to 46. The bottle made from the polycarbonate according to the invention displays a regular variation (square symbols). The bottle made from the polycarbonate according to the comparative example displays an irregular variation (triangular symbols).

EXAMPLES

A polycarbonate was produced with the extensional rheological properties according to the invention (according to the example). The plastic pellets were then used to make water bottles with a volume of 5 gallons and the wall thickness distribution was measured. A corresponding process was performed with a comparative product that does not have the extensional rheological properties according to the invention (according to the comparative example).

Water bottles having a homogeneous wall thickness distribution were obtained from the polycarbonate according to the invention but not from the polycarbonate according to the comparative example.

1. Production of the Polycarbonates

Example 5515.7 g (24.16 mol) bisphenol A and 31.10 g isatin bis-cresol were dissolved in 33.40 kg of 6.5% sodium hydroxide solution under a nitrogen atmosphere whilst being stirred. A mixture of 70.6 g phenol and 36.03 kg methylene chloride was added to this solution. 2967.7 g phosgene were then introduced over 30 minutes with intensive stirring at 20 to 25° C. and a pH of 13, which was maintained by the addition of further sodium hydroxide solution. This introduction was followed by the addition of 28.3 g N-ethyl piperidine with stirring for 45 minutes at a pH of 13.

The alkaline phase was separated from the organic phase. The organic phase was adjusted to a pH of 1 with dilute phosphoric acid or hydrochloric acid. It was then washed free from electrolytes with deionised water. After replacing the methylene chloride with chlorobenzene the polycarbonate was isolated by known means using an evaporation extruder.

The polycarbonate thus obtained had a relative solution viscosity, measured in a concentration of 0.5 g polycarbonate in 100 ml methylene chloride at 25° C., of 1.325.

Comparative Example 6.91 g isatin bis-cresol and 78.4 g phenol were used as in the example above. A polycarbonate having a relative solution viscosity of 1.305 was obtained. Isatin bis-cresol, that is 3,3-bis(3-methyl-4-hydroxyphenyl)-2-oxo-2,3-dihydroindole is available commercially.

2. Description of the Production of 5-gallon Water Bottles from Polycarbonate by the Extrusion Blow Molding Process The bottles were produced with a KBS 2-20 extrusion blow molding machine supplied by SIG Blowtec, which was equipped as follows. An extruder having a screw measuring 100 mm in diameter and having a length of 25 D was used, which at relative low screw speeds introduced little frictional heat into the material. The plasticising capacity was between approx. 145 and 190 kg/h with a bottle weight of approx. 750 g net and a production rate of 130 to 144 bottles/hour. The plasticising cylinder was equipped with regulated heating zones and fans, which ensure an exact and constant temperature control. It was driven by means of a thyristor-controlled d.c. unit, which provided a uniform delivery of material and a constant torque. The parison die consisted of a fifo accumulator head (fifo=first in—first out) with a 3.5 litre accumulation volume and overlapping heart-shaped grooves. The double heart-shaped grooves, which are offset by 180°, produce an internal and external parison and convey the melt stream into the accumulator chamber. The mandrel and die in the die head were of a conical design. The mandrel was moved axially relative to the conical die by means of a wall thickness control program. This enabled the weight of the bottle to be optimised and the wall thickness to be adjusted to the corresponding bottle sections, such as e.g. in the base section.

The extruder temperatures were 110° C. in the feed zone and between 245° C. and 265° C. in the individual heating zones. The die head temperatures were between 245° C. and 250° C. and the die temperature 275° C. The composition temperature was determined as 267° C. The average cycle time was 25.8 s±0.2 s, with a parison delivery time of 5.3 s, which corresponds to a production rate of 138 to 140 bottles per hour. A conventional vertical wall thickness profile for 5-gallon polycarbonate bottles was used to control the wall thickness. The bottles that were produced had a net weight of 750 g to 850 g and were annealed immediately afterwards by infrared radiation. The purpose of the conditioning was to relax the material quickly and to reduce the associated process-related internal stress. An infrared radiation oven supplied by Process Dynamics Inc., USA, with the model name Protherm 850-3, serial no.: KRK 7110, was used. The setting temperatures for the seven heating zones that were provided were selected such that a surface temperature of the bottles of 130° C.±2° C. was ensured.

TABLE 1

Bottle geometry and weight of the water bottle from the example/comparative example:

| | Average wall thickness [mm] | Surface area [cm2] | Volume [cm3] | Calculated weight [g] |
|---|---|---|---|---|
| Example | | | | |
| Neck | 2.35 | 129.53 | 30.440 | 36.53 |
| Shoulder | 2.01 | 642.44 | 129.130 | 154.96 |

TABLE 1-continued

Bottle geometry and weight of the water bottle from the example/comparative example:

| | Average wall thickness [mm] | Surface area [cm2] | Volume [cm3] | Calculated weight [g] |
|---|---|---|---|---|
| Body | 1.30 | 2747.82 | 357.217 | 428.66 |
| Base | 2.14 | 547.11 | 117.082 | 140.50 |
| Total | | 4066.90 | 633.87 | 760.65 |
| Comparative example | | | | |
| Neck | 2.75 | 129.53 | 35.588 | 42.71 |
| Shoulder | 2.30 | 642.44 | 147.681 | 177.22 |
| Body | 1.35 | 2747.82 | 369.696 | 443.64 |
| Base | 2.23 | 547.11 | 122.224 | 146.67 |
| Total | | 4066.90 | 675.19 | 810.23 |

3. Description of the Wall Thickness Measurement on the Water Bottles

The wall thicknesses were measured using an ultrasonic wall thickness gauge supplied by Krautkraimer GmbH & Co, Hürth, Germany, model number CL3 DL. This device operates on the pulse-echo principle. The measurement of the transit time of the pulse through the material begins with the entry echo that is generated when a part of the ultrasonic pulse is reflected back from the interface between the delay line and the surface of the material to be measured. Depending on the thickness of the material, the CL3 DL automatically decides whether to measure from the entry echo to the first back-wall echo (interface-to-first mode) or to measure between successive back-wall echoes (multi-echo mode). An ultrasonic delay line probe for a measuring range from 0.125 mm to 3.8 mm specially designed for plastics, the ALPHA DFR-P, was used, with a nominal frequency of 22 MHz and a coupling area of 6.4 mm. The wall thickness measurements were performed at 46 measuring points (see FIG. 4) directly on the bottle using an ultrasonic couplant.

TABLE 2

Wall thicknesses at the measuring points

| Measuring point | Measuring zone | Wall thickness [mm] Example | Wall thickness [mm] Comp. example |
|---|---|---|---|
| 1 | Neck | 2.27 | 2.57 |
| 2 | Neck | 2.42 | 2.92 |
| 3 | Shoulder | 2.28 | 2.78 |
| 4 | Shoulder | 2.14 | 2.66 |
| 5 | Shoulder | 1.88 | 2.39 |
| 6 | Shoulder | 1.72 | 1.92 |
| 7 | Body | 1.53 | 1.63 |
| 8 | Body | 1.36 | 1.36 |
| 9 | Body | 1.22 | 1.14 |
| 10 | Body | 1.16 | 1.45 |
| 11 | Body | 1.14 | 1.08 |
| 12 | Body | 1.16 | 1.32 |
| 13 | Body | 1.19 | 1.17 |
| 14 | Body | 1.24 | 1.78 |
| 15 | Body | 1.3 | 1.86 |
| 16 | Body | 1.38 | 1.96 |
| 17 | Body | 1.45 | 1.76 |
| 18 | Body | 1.57 | 1.89 |
| 19 | Base | 1.72 | 1.78 |
| 20 | Base | 1.94 | 2.28 |
| 21 | Base | 2.16 | 2.56 |
| 22 | Base | 2.33 | 2.73 |
| 23 | Base | 2.46 | 2.53 |
| 24 | Base | 2.45 | 2.39 |
| 25 | Base | 2.35 | 2.48 |
| 26 | Base | 2.19 | 2.29 |
| 27 | Base | 2.02 | 1.94 |
| 28 | Base | 1.76 | 1.36 |
| 29 | Body | 1.58 | 1.21 |
| 30 | Body | 1.45 | 1.09 |
| 31 | Body | 1.35 | 1.37 |
| 32 | Body | 1.29 | 1.43 |
| 33 | Body | 1.25 | 1.34 |
| 34 | Body | 1.19 | 0.94 |
| 35 | Body | 1.16 | 1.18 |
| 36 | Body | 1.15 | 0.96 |
| 37 | Body | 1.14 | 1.27 |
| 38 | Body | 1.22 | 0.94 |
| 39 | Body | 1.33 | 1.03 |
| 40 | Body | 1.48 | 1.13 |
| 41 | Shoulder | 1.68 | 1.35 |
| 42 | Shoulder | 1.92 | 2.09 |
| 43 | Shoulder | 2.12 | 2.51 |
| 44 | Shoulder | 2.3 | 2.69 |
| 45 | Neck | 2.45 | 2.86 |
| 46 | Neck | 2.25 | 2.64 |

In some cases the polycarbonates that are unsuitable for the production of water bottles cannot be deformed at all to high total elongation values ($\epsilon$>2.5) since the samples constrict and/or fail.

The measurement results for uniaxial extensional viscosity may depend very greatly on the correct experimental procedure. If the experiment is performed incorrectly, very elevated extensional viscosities may be measured that do not actually exist; in order to obtain correct measured values it is important that the experiment is performed and evaluated adequately (cf. Th. Schweizer, Rheol. Acta 39 (2000) 5, pages 428–443; J. S. Schulze et al., Rheol. Acta 40 (2001) pages 457–466; and V. C. Barroso, J. A. Covas, J. M. Maia Rheol. Acta 41 (2002) pages 154–161).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A polycarbonate resin characterized in that in the uniaxial elongation test performed at a temperature of 200° C. with rising Hencky strain $\epsilon$ the extensional viscosity $\eta_E$ rises more sharply than $3\eta$ where $\eta$ is the shear viscosity.

2. The polycarbonate resin according to claim 1, whereby at a temperature of 200° C., with a Hencky strain $\epsilon$ of 2.0 and a strain rate range $\dot{\epsilon}$ of between 0.1 and 0.01, the ratio S is greater than 1.1 and with a Hencky strain $\epsilon$ of 2.5 and a strain rate range $\dot{\epsilon}$ of between 0.1 and 0.01, the ratio S is greater than 1.1, whereby S is $\eta_E$ divided by $3\eta$.

3. The polycarbonate resin according to claim 1, whereby at a temperature of 200° C., with a Hencky strain $\epsilon$ of 2.0 and a strain rate range $\dot{\epsilon}$ of between 0.1 and 0.01, the ratio S is greater than 1.3 and with a Hencky strain $\epsilon$ of 2.5 and a strain rate range $\dot{\epsilon}$ of between 0.1 and 0.01, the ratio S is greater than 1.5, whereby S is $\eta_E$ divided by $3\eta$.

4. A thermoplastic molding composition comprising the polycarbonate resin of claim 1.

5. A container molded of the composition of claim 4.

6. The container of claim 5 wherein the container is a water bottle.

7. A process of making a container comprising (i) obtaining a thermoplastic molding composition that contains a polycarbonate resin characterized in that in the uniaxial elongation test performed at a temperature of 200° C. with rising Hencky strain $\epsilon$ the extensional viscosity $\eta_E$ rises more sharply than $3\eta$ where $\eta$ is the shear viscosity, and (ii) forming a container from the composition by extrusion blow molding.

8. A process of making a container comprising (i) obtaining a thermoplastic molding composition that contains a polycarbonate resin characterized in that in the uniaxial elongation test performed at a temperature of 200° C. with rising Hencky strain $\epsilon$ the extensional viscosity $\eta_E$ rises more sharply than $3\eta$ where $\eta$ is the shear viscosity, and (ii) forming a container from the composition by injection blow molding.

* * * * *